April 21, 1925.
C. THURSTONE
1,534,995
SPRING SUSPENSION SYSTEM FOR VEHICLES
Filed Feb. 15, 1923  2 Sheets-Sheet 1
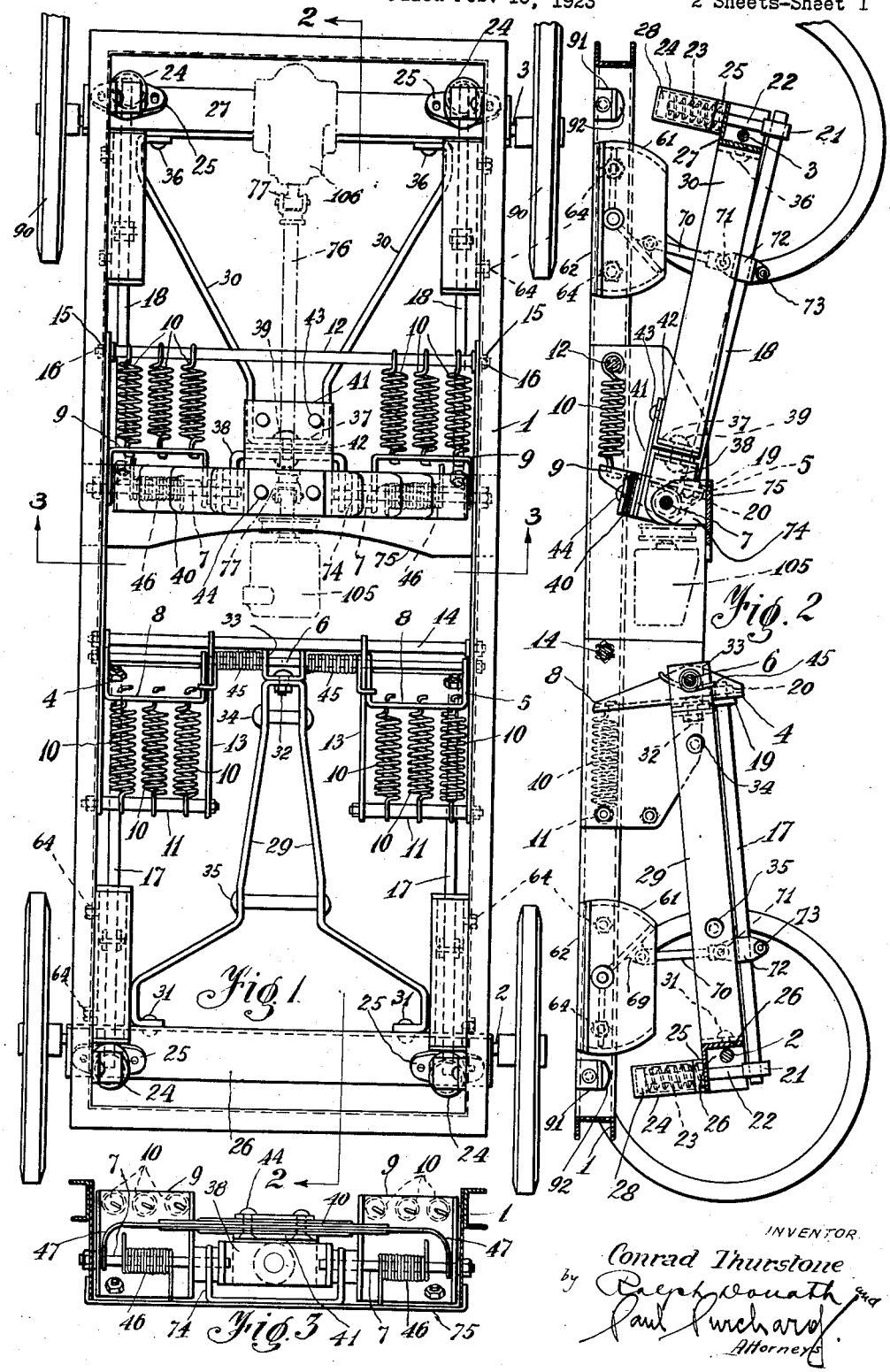
INVENTOR
Conrad Thurstone
by
Attorneys

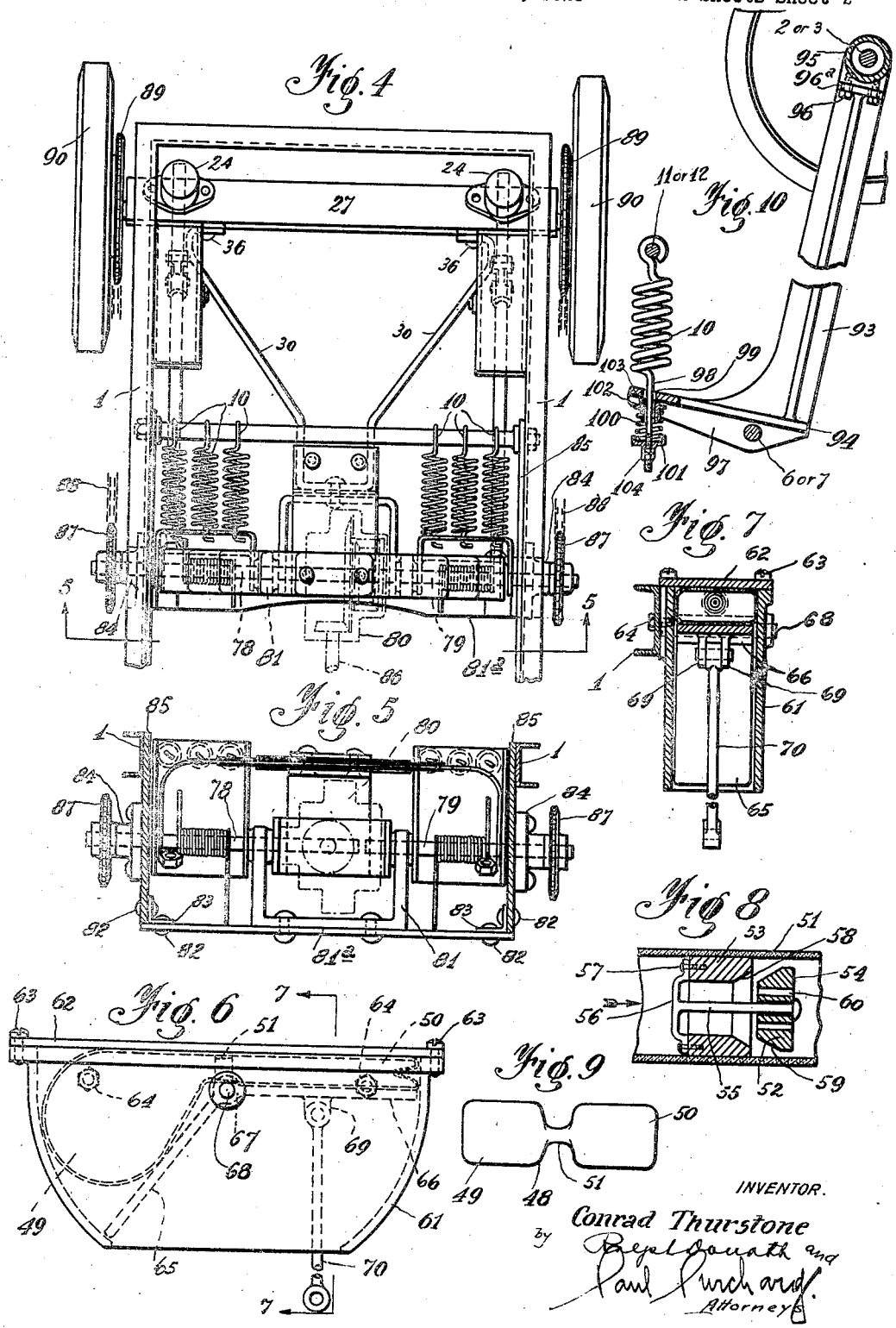

Patented Apr. 21, 1925.

1,534,995

UNITED STATES PATENT OFFICE.

CONRAD THURSTONE, OF PITTSBURGH, PENNSYLVANIA.

SPRING-SUSPENSION SYSTEM FOR VEHICLES.

Application filed February 15, 1923. Serial No. 619,208.

*To all whom it may concern:*

Be it known that I, CONRAD THURSTONE, a citizen of the United States, residing at Pittsburgh, in the county of Allegheny and State of Pennsylvania, have invented certain new and useful Improvements in Spring Suspension Systems for Vehicles, of which the following is a specification.

This invention relates to vehicle spring suspension systems, and more particularly to spring suspension systems used on self propelled vehicles, such as passenger and freight automobiles, as well as to chassis of aerial vehicles.

One of the principal objects of this invention is to provide a spring suspension of such resiliency as to eliminate the necessity of using pneumatic tires. Another object is to devise a spring suspension system which is more protected against mud and rain than are the systems of spring suspension now in use. A further object is to provide a spring suspension system in which the loads and shocks are carried by a great number of easily renewable springs, thus insuring greater resiliency and a greater factor of safety against total breakdowns. Still another object is to provide a spring suspension system in which provisions are made to reduce the lateral swaying motions of the vehicle body, the rebounds and unsprung weight to a minimum. Another important object is to devise such a system of spring suspension which is practical and which can be manufactured at relatively low cost. Further advantages and features of the present invention will appear from the description and drawings forming part of this application.

In the drawings:—

Fig. 1 is a top plan view of an automobile chassis built in accordance with my invention.

Fig. 2 is a longitudinal section taken along line 2—2 in Fig. 1.

Fig. 3 is a cross-sectional view taken on line 3—3, Fig. 1.

Fig. 4 is a partial plan view showing the application of my invention to an automobile chassis of the chain-drive type.

Fig. 5 is a cross-sectional view taken along line 5—5 in Fig. 4.

Fig. 6 is a side elevation of a pneumatic shock regulator used in connection with my spring suspension system.

Fig. 7 is a cross-sectional view taken substantially on line 7—7, Fig. 6.

Fig. 8 is an enlarged view of an air valve used in my pneumatic shock regulator.

Fig. 9 is a plan view of a resilient bag used in the shock regulator.

Fig. 10 is a fractional view showing a modified construction of a resilient axle suspension.

Referring to Figs. 1, 2 and 3, the vehicle frame 1 is supported upon the wheel axles 2 and 3 by means of the bell-crank levers 4 and 5, rockably mounted respectively upon the transverse stationary rod 6 and the shorter stationary rods 7. The latter are supported at one end in the frame 1 and at the other end in the upwardly turned U-shaped support 74, mounted upon the transverse bottom plate 75. Rods 7 are placed in alignment but are spaced endwise to provide room for the passage of the drive shaft 76 and universal joint 77. These parts, as well as the transmission case 105 and the differential 106, are shown in dot and dash lines.

The shorter, and substantially vertical arms 8 and 9 of the bell-crank-levers are made of sufficient width to accommodate the attachment of the required number of coil springs 10, the other ends of which are suitably secured to cross bars 11 and 12; the former ones being short and rigidly mounted between one side of the frame 1 and special plates 13, held in place by the rod 6 and a cross tie-rod 14. The cross bar 12 extends across the frame and acts also as a tie-rod therefor, being securely held by means of the bolt nuts 15 screwed upon its threaded ends 16.

The longer and nearly horizontal arms 17 and 18 of the bell-crank-levers are shown as being secured to the shorter arms by means of the shoulders 19 and the nuts 20, at a point preferably below the fulcrum centers of the levers. The outer ends of the longer arms slidably engage the suitably apertured heads 21 of the piston rods 22 of the light-load supporting springs 23, which are shown as being enclosed in an appropriate cylindrical casing 24, closed at the top and secured by means of flanges 25 upon the axle-casings 26 and 27, shown in the drawings as being of L-shaped cross-section. The outer ends of arms 17 and 18 are suspended from the springs 23 by the piston members 28.

The upward movements of the axles are limited by the stops 91 secured to the frame and provided on their striking side with pads 92 of any desired resilient and durable material, to absorb the shocks and the noise thereof.

In heavy duty automobile trucks, the front axle 2 is preferably strengthened against distortion by means of the radial braces 29, secured to the front axle casing 26 by means of bolts or rivets 31, whereas the inner end of said radial brace is pivotally secured by means of the bolt 32 to a substantially U-shaped member 33 which is rockable upon the transverse rod 6. Spacer rivets 34 and 35 are also used to strengthen both legs of the radial brace.

The rear axle is similarly strengthened for heavy loads by the radial brace 30, the outer ends of which are secured to the rear axle casing 27 by the rivets 36. The closed inner end 37 of this radial brace is also pivotally connected to the U-shaped member 38 by means of a pin 39. Member 38 is rockably mounted upon the inner ends of the rods 7. Said inner end of the radial brace is moreover connected to the center of a transverse leaf spring 40 (the purpose of which is described hereafter) by means of a flat plate 41, fastened at one end upon the angle iron member 42, secured to the brace, and at the other end to the underside of said leaf spring. Rivets 43 and 44 are indicated as means for securing plate 41.

Springs 10 are furthermore assisted in carrying the loads by transverse coil-springs 45 and 46 mounted respectively on rods 6 and 7. One end of said transverse springs is held stationary in any suitable manner, whereas the other end acts upon the short arms 8 and 9 in the same sense as springs 10.

Lateral rocking of the vehicle body and frame is greatly attenuated by the transverse leaf-spring 40, the longer leaves of which are turned down to form the extensions 47 engaged by the stationary rods 7. It will be noted that, on account of the spring 40 being connected at the center of the radial brace 30, both ends of the former will be enabled to follow the sidewise rocking movements of the frame, while at the same time retarding and reducing their intensity. In the drawings is shown the application of but one transverse leaf-spring; but it will be readily understood that, if needed, a similar spring could be connected to the forward brace 29 and the transverse rod 6.

By the action of the bell-crank-levers and springs, when either one or more wheels strike an obstacle, their axle is brought nearer the frame 1 and immediately thereafter the reaction of the springs would force the frame and body suddenly upward, and a prolonged up and down swaying thereof would result. To prevent, or reduce this, each long arm of the bell-crank-levers is connected to a pneumatic shock regulator, the function of which is to permit the quick upward motion of the axles and dampen the rebound action of the springs.

The preferred construction of the shock regulator is especially shown in Figs. 6 to 9; it consists of a rubber bag 48 having two bellies 49 and 50, connected by a tubular neck 51 within which is securely held a valve 52, composed of a sleeve-body 53; a valve-disc 54 and a guide-post 55 fastened to the valve body by the cross arms 56 and screws 57. The seat 58 in the valve body is shaped to accurately accommodate the tapered portion 59 of the valve-disc, in which are also drilled one or more small holes 60 of adequate diameter. It will be noted that air flowing in the direction of the arrow, that is from belly 49 to belly 50, will find the valve wide open, as shown in Fig. 8, whereas when the direction of flow is reversed, the valve-disc will close upon its seat 58 and the air will be forced to flow through the small holes, thus retarding the passage of the air from belly 50 to belly 49. The air flow in the direction of the arrow corresponds to the upward movement of a wheel passing suddenly over an obstacle, while the reverse flow serves to regulate the rebound action of the springs.

Each rubber bag is enclosed in a suitably shaped housing 61, open at the bottom and closed at the top by a cover 62 held in place by screws 63. The housing is securely mounted on the frame 1 with screws 64 and is positioned in vertical alignment with the long arm of its corresponding bell-crank-lever.

The bellies 49 and 50 of the rubber bags are acted upon by the angularly disposed flat arms 65 and 66 respectively of a lever 67 centrally mounted within the housing for rocking motion upon a pin 68 positioned a sufficient distance below the cover 62 to provide room for the rubber bag between the cover and lever 67.

Upon the underside of arm 66 are provided two spaced lugs 69 between which is hingedly secured the connecting rod 70, the lower end of which is also hingedly mounted by means of a pin connection 71 to a clamping member 72 adjustably securable upon the long arms 17 or 18 through the bolts 73.

My system of spring suspension can also be applied to chain driven vehicles. Such an application is illustrated in Figs. 4 and 5. It will be noted therein that the required changes affect the driving mechanism exclusively. The rods 7 in Figs. 1 and 2 are replaced by the shafts 78 and 79 driven by the differential gear 80 shown in dot and dash lines. The inner ends of shafts 78 and 79 are mounted for rotation in a central bearing support 81 resting upon the transverse plate 81ª, secured to the frame by means of rivets 82 and corner angles 83. Said shafts are supported outwardly in bearings 84 mounted upon the side plates 85 depending from frame 1.

Power from the drive shaft 86 is transmitted to the rear axle through the sprockets 87, mounted on shafts 78 and 79 and connected by means of the sprocket chain 88 to the sprocket wheels 89, secured in any desired manner to the rear wheels 90. The other parts are similar to those used for shaft driven vehicles and have been identified by the same numerals.

In the modified construction shown in Fig. 10, the light-load spring 23 and correlated parts have been eliminated, thus reducing the cost of manufacture. In this modification the long arm 93 of the bell-crank-lever 94 is fastened suitably to the axle casing 95, such as by bolts 96 engaging holes 96ª made somewhat larger to take care of the slight relative movements between the bell-crank-lever and the axle, due to the up and down movements of the latter. The short lever-arm 97 is formed integrally with the long arm 93 thus producing a one-piece bell-crank-lever, having its fulcrum on rods 6 or 7.

The free ends 98 of coils 10 pass through suitable apertures 99 in the short arm and are lengthened and partly threaded to enable the mounting thereon of the light-load springs 100 which are clamped between outside, cup-shaped, washers 101 and flanges sleeve-members 102. These sleeves act as guides for the springs; their rear ends 103, which contact with the small arm 97, being preferably made spherical to facilitate the adjustment of the springs to the various positions which the bell-crank-lever may take. The tension of the springs 10 and 100 may be regulated, within limits, by the threaded nuts 104 screwed upon the free ends 98.

The operation of my spring suspension system will be easily understood from the following explanation taken in connection with the preceding description: In the construction shown in Figs. 1 to 5, when the loaded vehicle is standing still, or running over a smooth road, the load is resiliently carried by the springs 23 which are considerably weaker than springs 10. The latter may in fact be considered, for the time being, as nonresilient connecting members. However, when the wheels of the vehicle, while running, suddenly strike an obstacle, the strain on the springs 23 is so much augmented as to compress them completely into a solid body and, then only, do the strong springs 10 come into play and absorb the excessive road shocks. The pneumatic shock regulators will operate under smooth and rough running conditions; but it is especially in the latter case that their rebound regulating action will be of greatest effect.

If but one wheel strikes an obstacle, the shock on the wheel will cause considerable lateral swaying of the frame and body. This swaying is taken care of by the transverse leaf-spring 40, assisted also by the action of the pneumatic shock-regulators 48.

Similarly, when the modified construction shown in Fig. 10 is used, the normal loads at standstill, or smooth running, will be borne by the springs 100 and the heavy shocks by the strong springs 10.

From the foregoing description it is obvious that this spring suspension system will function equally well in the chassis of an aerial vehicle, where it will accelerate the initial ascent and lessen the impact on landing. By the application of this spring system both to landing wheels and wing-wheels, the danger of breakage and first shock on alighting would be greatly reduced.

Detailed description and illustration of the application of this spring suspension system proper to the chassis of an aerial vehicle would be a duplication of some of the foregoing, and therefore mention of such application of this system is deemed sufficient.

As will be understood, as suggested herein, there may be slight changes made in the construction and arrangement of details of my invention without departing from the field and scope of the appended claims, in this application in which the preferred forms only of my invention are disclosed in connection with automobile chassis.

What I claim is:

1. In a vehicle, the combination of bell-crank levers having long and short arms; resilient means for normally holding said long arms in a substantially horizontal position; axles supported on the free ends of said long arms; transversely disposed resilient means for absorbing the lateral swaying movements of the superstructure of said vehicle, and fluid means for regulating the rocking movements of said bell-crank levers.

2. In a vehicle, the combination of bell-crank levers having long and short arms; resilient means for normally holding said long arms in a substantially horizontal position; axles resiliently supported on the free ends of said long arms; transversely disposed unitary resilient means for absorbing the lateral swaying movements of the superstructure of said vehicle, and fluid means for regulating the rocking movements of said bell-crank levers.

3. In a vehicle, the combination of bell-crank levers having long and short arms; resilient means for normally holding said long arms in a substantially horizontal position; resilient means for supporting axles upon the free end of said long arms; said latter resilient means being weaker than said former resilient means; transversely disposed resilient means for absorbing the lateral swaying movements of the superstructure of said vehicle, and pneumatic means for regulating the rocking movements of said bell-crank levers.

4. In a vehicle, the combination of bell-crank levers having long and short arms; resilient means for normally holding said long arms in a substantially horizontal position; resilient means for supporting axles upon the free end of said long arms; said latter resilient means being weaker than said former resilient means; transversely disposed resilient means for absorbing the lateral swaying movements of the superstructure of said vehicle; pneumatic means for regulating the rocking movements of said bell-crank levers; said pneumatic means being so disposed as to enable the quick upward rocking movements of said axles and retard the rebound action of the resilient means cooperating with said bell-crank levers.

In testimony whereof I affix my signature.

CONRAD THURSTONE.